United States Patent

Sugimoto et al.

[11] Patent Number: 4,999,247
[45] Date of Patent: Mar. 12, 1991

[54] METHOD OF FORMING A COLORED COATING FILM ON A CROSS-LINKED POLYETHYLENE SHEET OR ELECTRIC WIRE

[75] Inventors: Yoshinobu Sugimoto; Yoshifumi Mizuguchi, both of Numazu; Yoshinobu Hoshino, Osaka, all of Japan

[73] Assignees: Yazaki Corporation; Yazaki Electric Wire Co., Ltd.; Nippon Oil and Fats Co., Ltd., all of Japan

[21] Appl. No.: 326,497

[22] Filed: Mar. 20, 1989

Related U.S. Application Data

[63] Continuation of Ser. No. 832,737, Feb. 25, 1986, abandoned.

[30] Foreign Application Priority Data

Feb. 26, 1985 [JP] Japan .................................. 60-035264
Mar. 26, 1985 [JP] Japan .................................. 60-059428

[51] Int. Cl.⁵ ..................... B32B 27/00; B32B 33/00
[52] U.S. Cl. ............................. 428/383; 174/120 SR; 428/375; 428/380
[58] Field of Search .............. 428/375, 379, 380, 383; 174/110 PM, 120 SR

[56] References Cited

U.S. PATENT DOCUMENTS

| | | | |
|---|---|---|---|
| 2,929,744 | 3/1960 | Mathes et al. | 428/383 |
| 3,794,522 | 2/1974 | Mueller et al. | 174/117 F |
| 4,367,185 | 1/1983 | Nojiri et al. | 264/54 |
| 4,400,580 | 8/1983 | Yamanouchi et al. | 428/383 |
| 4,496,686 | 1/1985 | Ansel . | |
| 4,521,485 | 6/1985 | Tondre et al. | 428/380 |
| 4,533,975 | 8/1985 | Bill | 523/437 |

FOREIGN PATENT DOCUMENTS

149867 12/1984 European Pat. Off. .
507966 3/1985 Japan .

Primary Examiner—Lorraine T. Kendell
Attorney, Agent, or Firm—Lowe, Price, LeBlanc, Becker & Shur

[57] ABSTRACT

A method of forming a colored coating film on a cross-linked polyethylene comprises coating a coloring paint prepared by blending a prepolymer having acryloyl and/or methacryloyl groups in the molecule, a monomer and/or oligmer having the above-mentioned groups in the molecule and a pigment on the surface of cross-linked polyethylene and then curing the paint under the irradiation of UV-rays.

2 Claims, 1 Drawing Sheet

METHOD OF FORMING A COLORED COATING FILM ON A CROSS-LINKED POLYETHYLENE SHEET OR ELECTRIC WIRE

This application is a continuation of application Ser. No. 832,737, filed Feb. 25, 1986, now abandoned.

BACKGROUND OF THE INVENTION

This invention concerns a method of forming a colored coating film on cross-linked polyethylene and, more specifically, a method of forming a colored coating film having a firm adherence to the surface of cross-linked polyethylene under the irradiation of ultra-violet rays (hereinafter simply referred to as UV-rays). It also relates to a cross-linked polyethylene insulated wire.

Polyethylene can be cross-linked using an organic peroxide or adding water to silanes or under the irradiation of electron rays and they have been widely utilized, particularly, as insulating materials for electric wires, cables and the like due to their excellent electrical, mechanical and thermal properties.

So-called polyolefinic materials such as polyethylene and polypropylene including cross-linked polyethylenes are generally non-polar substance having inactive surfaces. Accordingly, it has generally been considered so far that formation of a colored coating film with a firm adherence to such a polyoelefinic material is extremely difficult. Particularly, since cross-linked polyethylenes are less soluble even in usual organic solvents and carbonize without melting above the thermal decomposition temperature upon heating, it has been considered almost inevitable to obtain a colored coating surface with a good adherence by using conventional solvent type paints.

Accordingly, in the case of a color distinction of electric wire insulated with a cross-linked polyethylene there have been adopted, for example, a method of compounding a coloring pigment together with a polyethylene resin upon extrusion of polyethylene insulator before cross-linking or a method of inserting a colored tape such as of a nylon tape between an electrical conductor and a polyethylene insulator for later cross-linkining, etc. However, a number of extra working steps are required for changing color and steps are complicated in the former method, while a troublesome work of inserting the tapes and provision for the stocks of tapes on various colors are required in the latter method. Accordingly, the above-mentioned conventional methods are disadvantageous in an economical point of view and reducing the production efficiency. In view of the above, a more economical surface color coating method of a solvent type paint using a vehicle on the surface of cross-linked polyethylene has been proposed and put to practical use as the most effective way, since color-distinguished electric cables of required length can effectively be produced without the complexity of color change works upon extrusion.

That is, in this surface coloring method, a paint which is prepared by dissolving a resin such as cyclized rubber, polyamide and vinyl chloride as a vehicle together with a coloring pigment into a solvent is coated and then spontaneously dried or heated above the melting point of the vehicle simultaneous to evaporate the solvent thereby applying the coloring pigment together with the vehicle on the surface of the cross-linked polyethylene. However, the adherence of the coating paint with the cross-linked polyethylene is still poor in such a surface coloring method and, for instance, peeling is resulted to the coating film by the felt-friction test under the load of 500 g after reciprocating friction from about 10 to several tens cycles and the colored paint is liable to be peeled off in a relatively short period of time when it is used in such an application as electric wires, cables and the like that undergo frequent bending or friction. Furthermore, coloring may some time be indistinct and, in addition, circumstantial pollutions may possibly arise due to the evaporation of the solvent in the paint during production. Therefore, even this method is not quite satisfactory.

In view of the above, a method of using a paint prepared by blending a coloring pigment with a radiation ray curable resin has recently been proposed as a coloring method for polyolefinic material for the solvent type paint.

For instance, Japanese Patent Publication No. 7966/1975 discloses a coloring method which comprises coating an ink consisting of a polyfunctional monomer having two or more reactive functional groups and a pigment to the surface of plastic material as an object to be colored, polymerizing the monomer under the irradiation of radiation rays (electron rays) and chemically bonding the monomer with the plastic.

In the case of polyethylene, however, since it is necessary to previously add the monomer at least to the surface thereof prior to the coating of the ink in this method, the pre-treating step therefor is complicated. In addition, a large installation cost is required for the irradiation device used for coating and, further, the processing step for the irradiation of radiation rays has to be carried out in the absence of oxygen, for example, under an inert gas atmosphere.

SUMMARY OF THE INVENTION

It is an object of this invention to provide a method of forming a colored coating film having excellent adherence on the surface of a cross-linked polyethylene with ease, for which the formation of a colored firm coating film has been considered extremely difficult as described above.

A more specific object of this invention is to provide a method capable of forming a colored firm coating film having a excellent adherence and the abrasion-resistance to the surface of a cross-linked polyethylene in the presence of air even at a low irradiation energy of UV-rays readily and rapidly while requiring no complicated step such as previous addition of a functional monomer or the like to the resin.

A further object of this invention is to provide an electric wire insulated with a cross-linked polyethylene having a colored film with an excellent adherence coated on the surface of an insulating material of cross-linked polyethylene.

The foregoing object of this invention can be attained by the method of forming a colored coating film on the surface of a cross-linked polyethylene, which comprises coating a coloring paint prepared by blending a prepolymer having acryloyl and/or methacryloyl groups in the molecule, monomer and/or oligomer having the above-mentioned groups in the molecule and a pigment to the surface of the cross-linked polyethylene and then curing the paint under the irradiation of UV-rays.

The further object of this invention can be attained by the electric wire insulated with on the surface thereof a cross-linked polyethylene having a colored film comprising a coloring paint composed of a blend of a prepolymer having acryloyl and/or methacryloyl groups in the molecule, a monomer and/or oligomer having the above-mentioned groups in the molecule and a pigment which is coated on the surface of the cross-linked polyethylene followed by curing under the irradiation of UV-rays.

The prepolymer having acryloyl and/or methacryloyl groups in the molecule for use in this invention includes, for example, those compounds as described below: polyaddition compounds having two or more (metha)acryloyl groups in the molecule obtained by previously reacting a diisocyanate compound with a polyol and further reacting the thus formed isocyanate-terminated compound with a β-hydroxyalkyl (metha)acrylate (the expression "(metha)acrylate" involves both of acrylate and methacrylate correctively in the descriptions here and hereinafter); linear polyester compounds having a number of (metha)acryloyl groups pending from the skelton chain obtained by the open-ring polymerization of a dibasic acid anhydride such as phthalic anhydride, tetrahydrophthalic anhydride and hexahydrophthalic anhydride with a glycidyl (metha)acrylate; polymerizable esters prepared by the co-esterification of polyvalent alcohol having at least three exterifiable hydroxyl groups with a dicarboxylic acid selected from the group consisting of (metha)acrylic acid, dicarboxylic acids and anhydrides thereof; melamine-(metha)acrylate resins obtained by reacting melamine or benzoguanamine with formaldehyde, methyl alcohol and β-hydroxyalkyl (metha) acrylate and the like; unsaturated polyester resins prepared by reacting a glycidyl etherified compound of a polyhydroxy compound with (metha)acrylic acid; and epoxy poly(metha)acrylate resins prepared by reacting those resins containing two or more epoxy groups in the molecule such as bisphenol type epoxy resins and novolac epoxy resins with (metha)acrylic acid.

The monomer containing the acryloyl and/or methacryloyl groups in the molecule can include, for example, 2-ethylhexyl(metha)acrylate, 2-hydroxyethyl-(metha)acrylate, 2-hydroxypropyl(metha)acrylate, tetrahydrofulfryl(metha) acrylate, hexyldiglycol(metha)-acrylate, (metha)acrylamide, methylol(metha)acrylamide and butoxymethyl(metha)acryl amide. Further, the above-mentioned oligomer having the same groups as those in the monomer in the molecule can include, for example, ethylene glycol di(metha)acrylate, diethyleneglycol di)metha)acrylate, triethyleneglycol di(metha)acrylate, polyethyleneglycol di(metha)acrylate, 1,6-hexanediol di(metha)acrylate, neopentylglycol di(metha)acrylate, bishydroxyethylenic bisphenol A diacrylate, bis-hydroxypropilenic bisphenol A diacrylate, trimethylolpropane tri(metha) acrylate, pentaerythritol tri(metha)acrylate, pentaerythritol tetra(metha)acrylate, dipentaerythritol pentaacrylate and dipentaerythritol hexaacrylate.

The blending ratio of the prepolymer to the monomer and/or oligomer is within a range from 95:5 to 5:95 parts by weight and, preferably, from 80:20 to 10:90 parts by weight.

If the blending ratio of the prepolymer to the monomer and/or oligomer is out of the range specified above, it is difficult to obtain a sufficiently cured coating film. That is, if the prepolymer exceeds 95 parts by weight, the adherence is worsened although the curability is favorable. On the other hand, if the polymer is less than 5 parts by weight, the curability in the presence of air is worsened, by which the curing rate is significantly reduced.

Further, for moderating the curing distortion in the coating film thereby improving the adherence, the main agent having the above-mentioned composition may be blended with various thermoplastic resins having a compatibility with the monomer and the oligomer. The resins can include for example, polyvinyl acetate resin, polyvinyl butyral resin, cellulose type resin, vinyl acetate-acrylic acid ester copolymer resin, xylene resin and saturated polyester resin.

The blending agent using thermoplastic resin is desirably added by from 0.1 to 100 parts by weight and, preferably, from 0.5 to 30 parts by weight based on 100 parts by weight of the main agent. If the addition amount of the blending agent is less than 0.1 parts by weight, the moderating effect for the curing distortion of the coating film is almost lost and, while on the other, if it exceeds 100 parts by weight, the curability property and the solvent resistance of the coating film are undesirably reduced extremely.

The coloring pigment added to the main agent in this invention has no particular restriction and it typically includes titanium oxide, white lead, tin oxide, carbon black, zinc powder, lead suboxide, red iron oxide, red lead, chrome vermilion, cobalt red, chrome yellow, yellow iron oxide, yellow zinc, titanium yellow, ultramarine, chrome green, Hansa yellow, permanent yellow, permanent orange, permanent red, phthalocyanine blue and phthalocyanine green.

Furthermore, in addition to the photopolymerization initiator, sensitizing agent, filler and the like generally blended to a photocurable coating composition, the main agent composition may optionally be blended properly with levelling agent, defoaming agent, surface active agent, polymerization inhibitor, diluting solvent and the like.

Among them, the photopolymerization initiator can include, for example, benzophenone, benzyl, benzyl methyl ketal, 4,4'-bisdiethylamino benzophenone, 2,2-diethoxyacetophenone, thioxanthone, alkyl anthraquinone, 2,2-dimethoxy-2-phenylacetophenone, α-acyloxime ester, 1-phenyl-1,2-propanedione-2-)0-ethoxycarbonyl)oxime, 1-phenyl-1,2-propanedione-2-(0-benzoyl)oxime, chlorinated acetophenone derivative, 2-hydroxy-2-methylpropiophenone, 4'-isopropyl-2-hyroxy-2-methylpropiophenone, which may be used singly or as a mixture of two or more of them.

Further, the sensitizing agent can include, for example aliphatic amines, amines containing aromatic radical, sulfur compounds such as sodium diethylthiophosphate, N,N-di-substituted-p-aminobenzonitrile compounds, phosphor compounds such as tri-n-butyl phosphine and nitrogent compounds such as N-nitrosohydroxylamine derivative.

Each of the photopolymerization initiator and the sensitizing agent is usually added by from 0.05 to 10.0 parts by weight and, preferably, from 0.1 to 5 parts by weight based on 100 parts by weight of the main agent.

Furthermore, the filler usable herein can include those fillers employed ordinarily for paints, for example, extender pigment such as talc, mica and calcium carbonate, thixotropic agent such as silica, aluminum hydroxide and bentonite.

The colored coating film, for instance, for the electric wire insulated with a cross-linked polyethylene of this invention can be prepared by blending each of the above-mentioned ingredients to form a coloring paint (hereinafter simply referred to as UV-paint), coating the paint uniformly to the surface of the cross-linked polyethylene, followed by the irradiation of UV-rays. The UV-paint can be formed as a colored coating film on the surface of cross-linked polyethylene in case where the degree of cross-linking is greater than 50%, preferably, greater than 65%. The film is desirably coated uniformly to a thickness of less than about 10 μm and, preferably, to about 5 μm. If the coating thickness is greater than about 10 μm, or if the coating thickness is uneven, undesired troubles occur in the rapid formation of a cured coating film at a small dose of irradiation energy. Those conventional methods, for example, spray coating, flow coating, roller coating and dip coating can be employed as the coating method in this invention.

BRIEF DESCRIPTION OF THE DRAWINGS

This invention will now be described more in details while referring to the accompanying drawings, wherein.

DESCRIPTION OF THE PREFERRED EMBODIMENTS

It is recommended to use those means described below as the method of forming a coating film of a thin and uniform thickness on the surface of an elongate material such as an electric wire, pipe and cord.

Figure 1A:
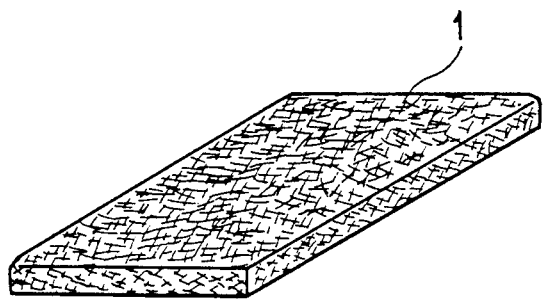
FIG. 1(a) is a perspective view of an elastic fibrous web.
Figure 1B:
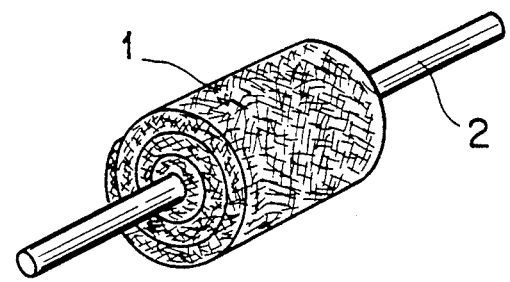
FIG. 1(b) is a perspective view showing the state where the web is wound around an elongate material.

That is, an elastic fibrous web 1 in the form of a mat as shown in FIG. 1(a) is prepared from elastic and abrasion-resistant fiber tows such as extremely fine stainless steel wires with an outer diameter of less than several tens μm and, preferably, less than about 20 μm by cutting them into an appropriate length, loosening by the use of a fiber opener or the like. The mat is wound around an elongate material 2 as an object to be coated as shown in FIG. 1(b), which is then mounted on a coating apparatus A for coating as shown in the side elevational longitudinal cross section of FIG. 2. The coating apparatus A comprises a cylindrical housing 3 and a hollow portion 4 disposed along the direction of the central axis thereof for passing the elongate material 2, in which the exit of the hollow portion 4 for the elongate material 2 passing therethrough is restricted in a funnel shape into a hollow portion 4a and a threaded portion 5 is formed to the follow portion 4b on the inlet of the elongate material 2. A bored bolt 6 formed with a through hole 7 for the elongate material 2 along the direction of the center axis of the threaded portion 5 is screw-coupled. The apparatus is so adapted that the elastic fiberous web 1 wound around the elongate material 2 is inserted to the inside of the hollow portion 4 of the coating apparatus A and, thereafter, the elastic fiberous web 1 may be compressed with an appropriate pressure by the bored bolt 6.

The UV-paint previously coated, for example, by the dipping method on the surface of the elongate material 2 is adjusted to a desired uniform thickness with an excess portion being absorbed to remove by the elastic fiberous web 1 during passage in the coating apparatus A. The adjustment can be performed smoothly controlling the clamping force of the bolt 6 thereby adjusting the amount of the pain retained in the vacancy in the elastic fiberous web 1. Further, since the elastic fiberous web 1 has an appropriate elasticity and abrasion resistance, a coating film of a uniform thickness can be formed conforming the unevennes at the coating surface and fluctuations in the outer diameter, if any, of the elongate material and a uniform coating film can be formed continuously for a long period of time without resulting in uneven coating, streak flaws, etc. over the entire length of the surface of the elongate material.

Then, UV-rays are irradiated for curing to the UV-paint coated on the surface of the cross-linked polyethylene as described above. The UV-paint according to this invention can be cured rapidly even under a slight irradiation energy, sufficient cure can be attained by the irradiation within a short time using a carbon arc lamp, mercury vapor lamp, UV fluorescent lamp, tungsten lamp, xenone lamp, argon glow lamp or metal halide lamp that generates UV-rays of about 200-400 nm wave length.

Although the radiation dose of UV-rays is different depending on the thickness of the coating film, blending composition and the like, a satisfactory coating film can be formed with an irradiation energy at 300 to 1000 mJ/cm$^2$. If the irradiation energy is less than 300 mJ/cm$^2$, coating film can not be cured sufficiently. On the other hand, if the irradiation energy is greater than 1000 mJ/cm$^2$, it is disadvantageous in an economical point of view, since energy is too much to form a sufficient cured coating film, and coating film or cross-linked polyethylene is liable to degrade.

EXAMPLE

This invention will now be explained with respect to preferred examples, in which colored coating films are formed on the surface of electric wires insulated with cross-linked polyethylene.

The blending compositions of the UV-paint used in each of Examples and Comparison Examples are shown in Table 1.

TABLE 1

| Composition | Compound Name | Example 1 | Example 2 | Example 3 | Example 4 | Comparative Example 1 | Comparative Example 2 |
|---|---|---|---|---|---|---|---|
| Prepolymer | epoxy-acrylate *1 | parts by weight 50 | parts by weight | parts by weight 15 | parts by weight 10 | parts by weight 50 | parts by weight |
| " | urethane acrylate *2 | | 14 | | | | |
| Monomer | tetra-hydro- | 10 | 16.5 | 16.5 | | | 30 |

TABLE 1-continued

| Composition | Compound Name | Example 1 | Example 2 | Example 3 | Example 4 | Comparative Example 1 | Comparative Example 2 |
|---|---|---|---|---|---|---|---|
| " | fulfryl acrylate | | | | | | |
| " | phenoxyethyl acrylate | 10 | 20 | | | | |
| " | hydroxypropyl acrylate | | | | 20 | | |
| Oligomer | trimethlolpropane triacrylate | | 15 | 20 | 20 | | 20 |
| " | pentaerythritol triacrylate | 11 | 15 | | | | 20 |
| " | neopentylglycol di-acrylate | | | 5 | | | |
| " | 2,2-bis(4-(Acryloxy diethoxy)phenyl)propane | | | | 20 | | |
| Blending agent | polyvinyl butyral resin | | 1 | 1 | 2 | 1 | 1 |
| Blending agent | copolymer of vinyl chloride and vinyl acetate *3 | 0.5 | | | | | |
| Coloring pigment | red iron oxide | | 12 | | | | |
| Coloring pigment | carbon black | 2 | | | | | |
| Coloring pigment | phthalo cyanine blue | | | 4 | | | |
| Coloring pigment | insoluble azo type red pigment | | | | 4 | 4 | 4 |
| Filler | talc | 15 | 20 | 36 | 21 | 22 | 22 |
| Polymerization initiator | ethylanthraquinone | 1.5 | 1 | | | | |
| Polymerization initiator | isopropylthioxanthone | | | 0.5 | 1 | 1 | 1 |
| Polymerization initiator | benzyl methyl ketal | | 2 | 1 | 2 | 2 | 2 |
| Sensitizer | ethyl 2-dimethylamino benzoate | | | 1 | | | |
| Solvent | toluol | | | | | 10 | |
| " | isopropyl alcohol | | | | | 10 | |
| | | 100.0 | 100.0 | 100.0 | 100.0 | 100.0 | 100.0 |

Remarks:
*1: A prepolymer containing two acryloyl groups in one molecule obtained by the reaction of adding acrylic acid to a bisphenol type epoxy resin.
*2: Prepolymer having two acryloyl groups in one molecule obtained by the reaction of adding 2-hydroxyethylacrylate to isophorone diisocyanate.
*3: Vinylite VAGH: trade name of products from U.C.C. Ltd. was used.

EXAMPLE 1

Figure 2:
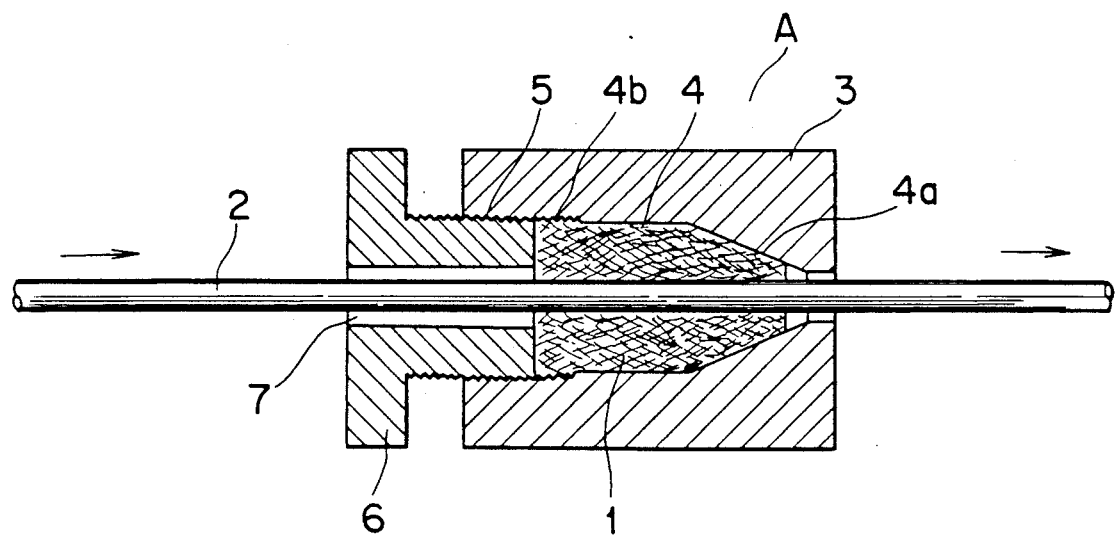
FIG. 2 is a side elevational cross sectional view of a coating apparatus.

A UV-paint with the composition and the blending ratio as shown in Table 1 was deposited by dip coating on an electric wire insulated with a cross-linked polyethylene (degree of cross-linking 80%) 3.4 mm in outer diameter under running continuously at a speed of 100 m/min and then the wire was passed through a coating apparatus filled with an elastic web composed of stainless steel fibers each 4 μm in the outer diameter as shown in FIG. 2 while removing an excess paint after coating by squeezing, to provide a coating to a film thickness of 5 μm. Then, from 10 cm distance between electric wire and metal halide lamps UV-rays were irradiated from two metal halide lamps having upper and lower reflection plates arranged in series with the running direction of the electric wire (manufactured by Eye Graphics Co., input 8 kw, effective lamp length 50 cm) to form an electric wire insulated with cross-linked polyethylene having at the surface thereof completely cured and colored coating film of acceptable black color (Irradiation energy, 420 mJ/cm$^2$).

After continuous four hours' operation, an electrical wire of 24000 m length insulated with the cross-linked polyethylene and colored at the surface was obtained, in which a uniform coating film with no uneven coating, streak flaws or the like was formed over the entire length.

A felt-friction test was carried out under a load of 500 g for the coating film by using an abrasion tester (Model P.V.F.Electric Wire Abrasion Tester, manufactured by Toyo Seiki Mfg. Co.) and, as a result, the coating film showed no peeling even after 1000 cycles of reciprocal friction and exhibited firm adherence and excellent abrasion resistance.

EXAMPLE 2

A UV-paint with the composition and the blending ratio as shown in Table 1 was deposited by dip coating on an electric wire insulated with a cross-linked polyethylene (degree of cross-linking 73%) 10.2 mm in outer diameter under running continuously at a speed of 40 m/min and then the wire was passed through the coating apparatus similar to that in Example 1 filled with an elastic web composed of stainless steel fibers each 8 μm in the outer diameter as shown in FIG. 2 while removing an excess paint after coating by squeezing, to provide a coating to a film thickness of 8 μm. Then, from 10 cm distance between electric wire and metal halide lamp, UV-rays were irradiated from one metal halide lamp as used in Example 1 to form an electrical wire insulated with a cross-linked polyethylene having at the surface thereof completely cured and colored coating film of acceptable red color. (irradiation energy, 520 mJ/cm$^2$)

After continuous four hours' operation, an electric wire of 9,600 m length insulated with the cross-linked polyethylene and colored at the surface was obtained, in which a uniform coating film with no uneven coating, streak flaws or the like was formed over the entire length. A film of a uniform thickness was formed conforming with the unevenness, if any, at the surface of the insulator caused by the twisting of the conductor.

A felt-friction test was carried out under the similar conditions to those in Example 1 and, as a result, the coating film showed no peeling even after 1000 cycles of reciprocal friction and exhibited firm adherence and excellent abrasion resistance.

EXAMPLE 3

A UV-paint with the composition and the blending ratio as shown in Table 1 was deposited by dip coating on an electric wire insulated with a cross-linked polyethylene (degree of cross-linking 75%) 17.0 mm in outer diameter under running continuously at a speed of 25 m/min and then the wire was passed through the coating apparatus similar to that in Example 1 filled with an elastic web composed of stainless steel fibers each 8 μm in the outer diameter as shown in FIG. 2 while removing an excess paint after coating by squeezing, to provide a coating to a film thickness of 5 μm. Then, UV-rays were irradiated in the same manner as in Example 1 to form an electric wire insulated with cross-linked polyethylene having at the surface thereof completely cured and colored coating film of acceptable blue color. (Irradiation energy, 840 mJ/cm$^2$)

After continuous six hours' operation, an electric wire of 9,000 m length insulated with the cross-linked polyethylene and colored at the surface was obtained, in which a uniform coating film with no uneven coating, streak flaws or the like was formed over the entire length. A felt-friction test was carried out under same condition as those in Example 1 and, as a result, the coating film showed no peeling even after 1000 cycles of reciprocal friction and exhibited firm adherence and excellent abrasion resistance.

EXAMPLE 4

A UV-paint with the composition and the blending ratio as shown in Table 1 was deposited on the same electric wire insulated with a cross-linked polyethylene using the same coating apparatus as in the Example 2 and cured by using the same metal halide lamps as in Example 2 to form a cured and colored coating film of acceptable black color.

After continuous four hours' operation, an electric wire of 9,600 m length insulated with the cross-linked polyethylene and colored at the surface was obtained, in which a uniform coating film with no uneven coating, streak flaws or the like was formed over the entire length. A felt-friction test was carried out under the same condition as in Example 1 and, as a result, the coating film showed no peeling even after 1000 cycles of reciprocal friction and exhibited firm adherence and excellent abrasion resistance.

COMPARATIVE EXAMPLE 1

A colored and cured coating film was formed to a thickness of 5μm on the same electric wire insulated with the cross-linked polyethylene as in Example 2 by using the paint with the composition and the blending ratio as shown in Table 1 and using the same coating apparatus and the metal halide lamp as those in Example 2.

An electric wire of 9,600 m length insulated with the cross-linked polyethylene colored at the surface thereof was obtained after four hours' of continuous operation, in which a uniform coating film was formed over the entire length with no uneven coating, streak flaws, etc. As a result of the similar friction test to that in Example 1 for the coating film, the film was stripped after about 500 cycles of reciprocating friction

COMPARATIVE EXAMPLE 2

A colored and cured coating film was formed to a thickness of 8 μm on the same electric wire insulated with the cross-linked polyethylene as in Example 3 by using the paint with the composition and the blending ratio as shown in Table 1 and using the same coating apparatus and the metal halide lamp as those in Example 2.

An electric wire of 2,700 m length insulated with the cross-linked polyethylene colored at the surface thereof was obtained after three hours' of continuous operation, in which a slight tackiness was left on the surface. As a result of the similar friction test to that in Example 1 for the coating film, although the film did not peel after several cycles of reciprocating friction, color migration to the felt occurred.

COMPARATIVE EXAMPLE 3

After coating a solvent type paint comprising 40% polyamide resin, 10% coloring pigment and 50% solvent to an electric wire insulated with the same cross-linked polyethylene as in Example 1 by way of a dipping method, the paint was spontaneously dried to solidify to form a colored coating film of about 10 μm thickness.

As a result of carrying out the same friction-test as in Example 1 for the coating film, the film was stripped after about 20 cycles of reciprocating friction.

As apparent from the foregoing Examples and Comparative Examples, satisfactory formation of colored coating film on the surface of cross-linked polyethylene can be obtained only when using the UV-paint according to this invention prepared by blending the prepolymer having acryloyl and/or methacryloyl groups in the molecule with the monomer and/or oligomer having the same organic groups within an appropriate range. Further, since the colored coating film can rapidly be formed even in the presence of air at a low radiation dosage of UV-rays, large scale facility and inert atmosphere as in the case of conventional electron irradiation are no more necessary, by which the installation cost required for the irradiation of radiation rays can significantly be reduced.

Furthermore, in the case of coating an elongate material, a firm colored coating film can be formed effectively by coating the film of the UV-paint to a uniform thickness of less than about 10 μm by using the above-mentioned coating apparatus deviced by the present inventor.

Accordingly, this invention contributes much to the improvement for the production of color-distinguished power cables made of cross-linked polyethylenes or the like, as well as for the surface pigmentation technology in other molding articles by enabling the formation of a firm surface colored coating film on the cross-linked polyethylene, for which the formation of the surface colored coating film has been considered difficult so far.

What is claimed is:

1. An electric wire insulated with a cross-linked polyethylene having a degree of cross-linking greater than 50% and having a colored coating UV radiation cured film on the surface thereof, said film comprising a coloring paint composed of a blend of a prepolymer having at least one member selected from the group consisting of acryloyl and methacryloyl groups in the molecule, a mono-functional monomer having a functional group selected from the group consisting of acryloyl and methacryloyl groups and a multi-functional monomer having a functional group selected from the group consisting of acryloyl and methacryloyl groups in the molecule and a pigment, said film being coated on the surface of the cross-linked polyethylene in a thickness of less than about 10 μm and then cured by irradiation in air with UV-rays, the blending ratio of said prepolymer to said mono-functional monomer and said multi-functional monomer being within the range of from 95:5 to 5:95 parts by weight; said mono-functional monomer being selected from the group consisting of 2-ethylhexyl(metha)acrylate, 2-hydroxyethyl-(metha)acrylate, 2-hydroxypropyl(metha)acrylate, tetrahydrofulfryl(metha)acrylate, hexyldiglycol(metha)-acrylate, (metha)acrylamide, methylol(metha)acrylamide and butoxymethyl(metha)acryl amide; said multi-functional monomer being selected from the group consisting of ethylene glycol di(metha)acrylate, diethyleneglycol di(metha)acrylate, triethyleneglycol di(metha)acrylate, polyethyleneglycol di(metha)acrylate, 1,6-hexanediol di(metha)acrylate, neopentylglycol di(metha)acrylate, bis-hydroxyethylenic bisphenol A diacrylate, bis-hydroxypropilenic bisphenol A diacrylate, trimethylolpropane tri(metha)acrylate, pentaerythritol tri(metha)acrylate, pentaerythritol tetra(metha)acrylate, dipentaerythritol pentaacrylate and dipentaerythritol hexaacrylate.

2. An electric wire insulated with a cross-linked polyethylene having a colored coating film on the surface thereof as defined in claim 1, wherein the irradiation energy of the UV-rays is within a range from 300 to 1000 mJ/cm$^2$.

* * * * *